United States Patent
Fujieda et al.

[11] Patent Number: 5,862,194
[45] Date of Patent: Jan. 19, 1999

[54] ZIRCONIUM BASED ALLOY OF LOW IRRADIATION GROWTH, METHOD OF PRODUCING THE SAME, AND USE OF THE SAME

[75] Inventors: Tadashi Fujieda; Masahisa Inagaki, both of Hitachi; Iwao Takase, Ibaraki; Junjiro Nakajima, Hitachi; Rinichi Asano, Hitachi; Takehiro Seto, Hitachi, all of Japan

[73] Assignee: Hitachi, Ltd., Tokyo, Japan

[21] Appl. No.: 814,337

[22] Filed: Mar. 11, 1997

[30] Foreign Application Priority Data

Mar. 13, 1996 [JP] Japan .................................. 8-055774

[51] Int. Cl.$^6$ ........................... G21C 3/07; C22C 16/00; C22F 1/16
[52] U.S. Cl. ........................ 376/260; 376/457; 148/672; 420/422
[58] Field of Search .................... 376/260, 457, 376/462; 148/672; 420/422

[56] References Cited

U.S. PATENT DOCUMENTS

| | | |
|---|---|---|
| 4,765,174 | 8/1988 | Cook et al. . |
| 4,938,921 | 7/1990 | Mardon et al. . |
| 5,297,177 | 3/1994 | Inagaki et al. .......................... 376/462 |
| 5,304,261 | 4/1994 | Yamamoto et al. ................ 148/672 X |

FOREIGN PATENT DOCUMENTS

| | | |
|---|---|---|
| 0488027 | 6/1992 | European Pat. Off. . |
| 0533186 | 3/1993 | European Pat. Off. . |
| 0689209 | 12/1995 | European Pat. Off. . |
| 59-229475 | 12/1984 | Japan . |
| 62-200286 | 9/1987 | Japan . |
| 5-017837 | 1/1993 | Japan . |
| 5-080170 | 4/1993 | Japan . |

*Primary Examiner*—Charles T. Jordan
*Assistant Examiner*—M. J. Lattig
*Attorney, Agent, or Firm*—Antonelli, Terry, Stout & Kraus, LLP

[57] ABSTRACT

The present invention provides a zirconium based alloy member which has very small deformation of elongation and bow occurring due to irradiation growth, a method of manufacturing it, and particularly an channel box for an atomic reactor fuel assembly. A zirconium based alloy plate member having a width of not less than 100 mm and a long length, containing not more than 5 wt % Nb and/or not more 5 wt % Sn, the member having (0001) orientation (Fl value) of hexagonal Zr with respect to longitudinal direction ranging from 0.20 to 0.35, the difference in Fl between the middle and the end being not more than the value calculated from (0.0935×Fl−0.00585) and an amount of bow at neutron irradiation of 35 GWd/t which bow occurs in the channel box for a reactor being not more than 2.16 mm.

11 Claims, 13 Drawing Sheets

FIG. 8
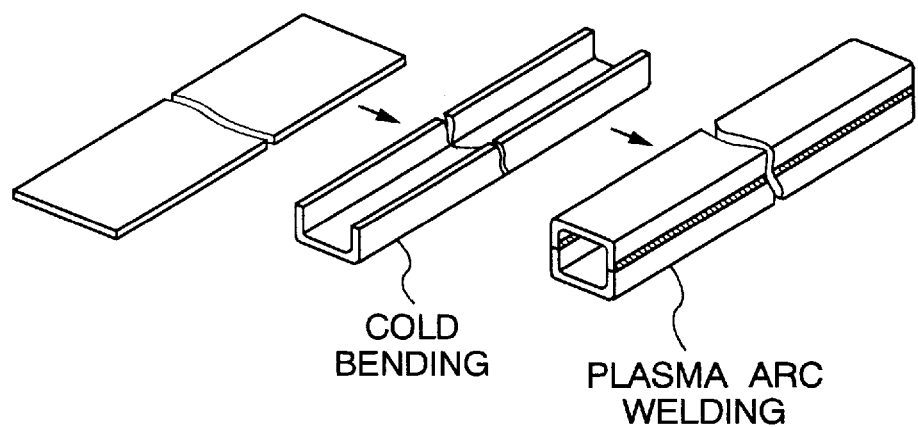
COLD BENDING   PLASMA ARC WELDING
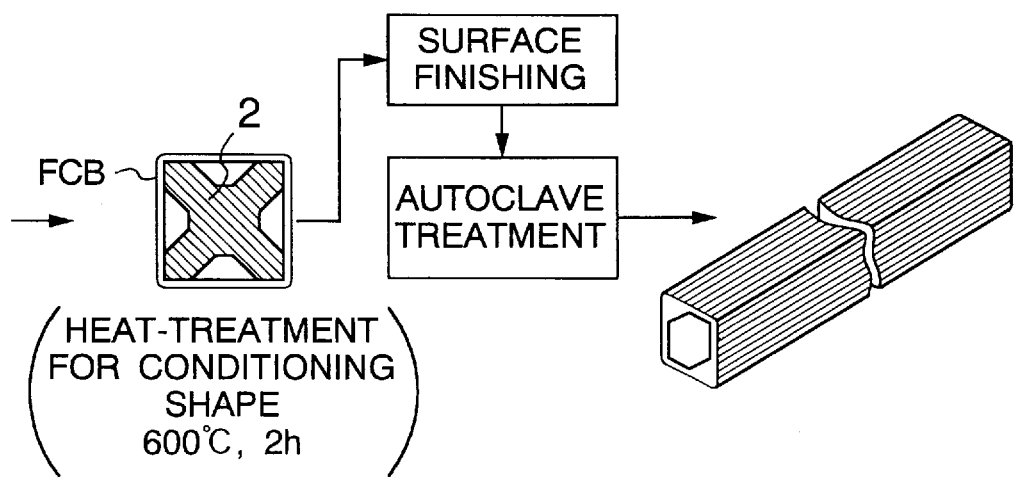

DIRECTION OF
FEEDING FCB

ZIRCONIUM BASED ALLOY OF LOW IRRADIATION GROWTH, METHOD OF PRODUCING THE SAME, AND USE OF THE SAME

BACKGROUND OF THE INVENTION

This invention relates to a novel zirconium based alloy plate, a method of manufacturing the alloy plate, a fuel channel and a fuel assembly both using the alloy plate.

Zirconium alloy is a material having high corrosion resistance and a small neutron absorption cross section and is therefore used for a reactor fuel assembly member. For this kind of use, Zr—Sn—Fe—Cr—Ni alloys called zircaloy-2 and zircaloy-4 are mainly used. If these alloys are used in a nuclear reactor for a long period of time, elongation and bow deformation in particular directions occur because (0001) planes thereof are oriented in the direction of plate thickness. If the bow deformation occurs in a fuel channel box, the space for driving the control rod is reduced, which impedes the operation of the reactor. Furthermore, if the bow deformation occurs, the distance to the fuel cladding tube is changed with the result that the ratio of water to uranium is locally changed, thereby causing a change in fission reactivity. As a result, the corrosion of the fuel cladding tube is accelerated by abnormal heating, and further fuel damage may thereby be caused. To prevent the bow deformation of the fuel channel box from occurring due to such non-uniformity of neutron exposure, uniformization of neutron exposure by changing the fuel assembly loading position in the reactor core has been examined. This means, however, has not succeeded in preventing the bow deformation. The reduction in the control rod driving space and the change in fission reactivity both caused by the bow deformation are major factors of limitation of the service life of the fuel channel box.

As a method of preventing the bow of the fuel channel box, making orientation of crystal grain random is disclosed in JP-A-59-229475, JP-A-62-200286, JP-A-5-17837 and JP-A-5-80170. However, the bow deformation due to irradiation growth cannot be further reduced fully due to the reason described below.

The prior arts make crystal orientation of zirconium alloy members random. However, a channel box is quadrilateral and tubular, and, particularly, JP-A-5-17837 and JP-A-5-80170 disclose that, in order to make crystal orientation random, a heat treatment is performed by performing heating in a β temperature range followed by quenching, however, it is difficult to heat and to keep the whole at uniform temperature. Consequently, if the whole member is not heated and kept at uniform temperature, there arises the difference in deformation by neutron irradiation, by which difference bowing occurs.

SUMMARY OF THE INVENTION

An object of the present invention is to provide a zirconium based alloy plate of a long service life, a tubular member of a long service life, a channel box using the member and a method of manufacturing them, wherein deformation due to neutron irradiation growth is equivalent in amount at each position and no bow deformation occurs.

In the present invention, the <0001> crystal orientation of hexagonal Zr metal of a zirconium alloy plate of a large size is made to be random, and the same random orientation is achieved at any position of the alloy plate.

According to the present invention, there is provided a zirconium based alloy plate of low irradiation growth having a width of not less than 100 mm and a long length, the alloy plate containing not more than 5 wt % Sn and/or not more than 5 wt % Nb, and not less than 90 wt % Zr, the alloy plate having crystal orientation of hexagonal Zr in which <0001> orientation (Fl value) with respect to longitudinal direction ranges from 0.2 to 0.35, and the difference (ΔFl) in the Fl value between widthwise middle and the widthwise end is not more than 0.025.

According to the present invention, there is provided a tubular member made of a zirconium based alloy plate of low irradiation growth, the alloy plate containing not more than 5 wt % Sn and/or not more than 5 wt % Nb, and not less than 90 wt % Zr, the member having <0001> orientation of hexagonal Zr crystal in which each of <0001> orientation (Fr value) with respect to direction perpendicular to the surface of the tubular member, another orientation (Fl) with respect to longitudinal direction of the tubular member and still another orientation (Ft value) with respect to circumferential direction of the tubular member ranges from 0.20 to 0.35, and the difference in Fl between the opposed faces thereof is not more than 0.025.

According to the present invention, there is provided a zirconium based alloy plate of low irradiation growth having a width of not less than 100 mm and a long length, the alloy plate containing not more than 5 wt % Sn and/or not more than 5 wt % Nb, and not less than 90 wt % Zr, the alloy having β phase, the grain size of the alloy being in the range of 50 to 500 μm, and the orientations of crystals at the widthwise middle of and the widthwise end of the plate being substantially the same.

According to the present invention, there is provided a tubular member of angular shape made of a zirconium based alloy of low irradiation growth and having a length of not less than 4 m, the alloy containing not more than 5 wt % Sn and/or not more than 5 wt % Nb, and not less than 90 wt % Zr, the alloy plate having <0001> crystal orientation of hexagonal Zr which <0001> orientation is substantially random, and an amount of bow of the member by neutron irradiation of 35 GWd/t degree of burn-up on taking-out being not more than 2.16 mm.

According to the present invention, there is provided a method of a producing a zirconium based alloy plate having a width of not less than 100 mm (preferably not less than 200 mm and further preferably from 250 mm to 400 mm) and a long length, the alloy containing not more than 5 wt % Sn and/or not more than 5 wt % Nb, and not less than 90 wt % Zr, the alloy plate being produced by being heated in a β single phase temperature range while continuously being moved, and by being cooled. In the present invention, there is provided a method of producing a zirconium based alloy plate of low irradiation growth, comprising the steps of heating the alloy into a β single phase temperature range so that <0001> orientation (Fl value) of hexagonal Zr with respect to longitudinal direction of the plate ranges from 0.20 to 0.35, and comprising means for reducing the temperature difference of the heating between the widthwise middle of and the widthwise end of the plate.

In the method of producing the zirconium based alloy plate of low irradiation growth in accordance with the present invention, it is preferred to retain in a short period of time the alloy member in the β single phase temperature range so that a value of parameter P defined by a next formula is not less than 0.8 and to thereafter quench the alloy:

$P = (3.55 + \log t) \times \log(T - 980)$ where t is a retention period of time (sec) and T is a heating temperature (° C.).

According to a further aspect of the present invention, there is provided a method of producing a tubular member of angular shape made of zirconium based alloy of low irradiation growth, comprising the steps of locally induction-heating the tubular member in a β single phase temperature range and forcibly cooling the heated portion of the tubular member by a cooling medium, the improvement comprising the step of retaining the tubular member in a short period of time in the β single phase temperature range and thereafter quenching it so that <0001> orientation (Fl value) of the hexagonal Zr crystal orientation with respect to a longitudinal direction of the tubular member is 0.20 to 0.35, and comprising means for reducing the temperature difference of the heating between the opposed faces of the tubular member.

According to the present invention, there is provided a method of producing a zirconium based alloy member, comprising the steps of: locally and continuously induction-heating the member in a β phase temperature range while being moved relatively and effecting a quenching treatment by forcibly cooling the heated portion of the member by use of cooling medium, the quenching treatment is performed plural times.

According to the present invention, there is provided a fuel channel box of a tubular member of angular shape formed by welding two channel-shaped zirconium based alloy members, the alloy having crystal orientation of hexagonal Zr in which the <0001> orientation (Fl value) with respect to the longitudinal direction of the tubular member ranges from 0.20 to 0.35, the difference (ΔFl) in the Fl values between the opposed faces of the tubular member being not more than 0.025, and the whole surface of the channel box being provided with an oxide coating formed by an autoclage treatment.

According to the present invention, there is provided a fuel assembly comprising fuel rods each provided within a fuel cladding tube with fuel pellet, a channel box receiving a plurality of pieces of the fuel rods, a spacer for partitioning the fuel rods received in the channel box, and upper and lower grids located respectively at the upper and lower portions of the channel box, the channel box being made of a zirconium based alloy containing not more than 5 wt % Sn and/or not more than 5 wt % Nb, and the balance Zr, the alloy having a crystal orientation of hexagonal Zr in which the <0001> orientation (Fl value) with respect to the longitudinal direction of the plate ranges from 0.20 to 0.35 and the difference in the Fl values between the opposed faces of the channel box being not more than 0.025.

According to the present invention, there is provided a channel box made of the above-mentioned zirconium based alloy in which channel box a plurality of nuclear fuel rods are disposed, the channel box being used so that the degree of burn-up on taking-out is not less than 32 GWd/t or so that nuclear fuel is exchanged at least two times during the use thereof, wherein an operation is preferably performed by locating the channel box for later operation in the same operation position as that of prior operation thereof.

In the channel box, fuel is exchanged at least two times, and deformation occurring for such a period of time as the degree of burn-up on taking-out becomes 35 Gwd/t or more or for such another period of time as neutron exposure becomes $10^{22}$ n/cm$^2$ or more is decreased, and particularly an amount of bow per 4 m length of the channel box is not more than 2.16 mm.

Specifically, the channel box can be effectively used at a higher degree of burn-up of 38, 45, and 50 or not less than 50 GWd/t, so that the advantage becomes remarkable.

Deformation of a zirconium alloy member occurs because the <0001> direction of a hexagonal Zr is directed almost perpendicularly to the surface of the member. In a case where the hexagonal lattice is subjected to neutron irradiation, crystals contract in the <0001> direction while expanding in the direction perpendicular to the <0001> direction. More strictly, a dislocation face perpendicular to the <0001> direction is introduced by neutron irradiation to cause the contraction and expansion to the particular directions. The amount of neutron irradiation becomes greater in a position closer to the center of the reactor core, and it becomes smaller in the periphery of the reactor core. In a channel box located at its periphery where an amount of neutron irradiation changes greatly, there occurs a variation in irradiation growth amount (difference of elongation) between the face of the reactor core side and the opposed face thereto, causing the channel box to bow. The amount of the bow can be calculated by the formula: δ(amount of bow)=K·{(1−3Fl)(L1−L2)+3L1ΔFl} where K is a constant, L1 and L2 being an amount of elongation caused by irradiation growth in the face of the reactor core side of conventional member and in the opposed face thereto respectively, Fl being an orientation of crystal with respect to the longitudinal direction of the channel box, and ΔFl is the difference in the Fl value between the opposed faces. The L1 and L2 depend on the degree of burn-out, so that the amount of the bow is found to be dependent on Fl value and ΔFl when the degree of burn-up is constant. The dependency of the amount of the bow of the channel box at 35 burn-up degree on Fl value and ΔFl is calculated by the formula, so that the amount of the bow becomes minimum at the Fl range of 0.33 to 0.35 as shown in FIG. 6 and is reduced as ΔFl is smaller. Hence, regarding the tolerable amount of bow deformation amount of the channel box while taking the blister deformation amount by creep into consideration, δ must be less than 2.16 mm at 35 GWd/t burn-up degree. Thus, in this case, ΔFl and Fl value must be controlled so that ΔFl≦0.025 and Fl=0.20 to 0.35 are achieved. Moreover, in a case where the difference of pressure occurs between the inside and outside of the channel box and where deformation of the blister toward the outside thereof is caused, the blister amount increases due to creep during irradiation.

A quenched member is deemed to have many sub-grain boundaries in each grain, and slippage along the grain boundaries is deemed to readily occur. Thus, the improvement can be achieved by decreasing the sub-grain boundaries by use of both annealing and recrystallization performed after cold rolling, whereby the amount of the bow of the channel box by irradiation growth is reduced and it becomes possible to obtain a channel box and a fuel assembly in both of which the leakage radiation dose is reduced.

The deformation occurs because <0001> crystal orientation of a hexagonal Zr metal is directed perpendicularly to the zirconium alloy surface. In a case where the hexagonal Zr metal is subjected to neutron irradiation, crystals contract in <0001> direction while expanding in the direction perpendicular to the <0001> direction. More strictly, a dislocation face perpendicular to the (0001) face is introduced by neutron irradiation to cause such contraction and expansion of the crystal. Consequently, in a fuel channel box in which <0001> crystal orientation is directed to be perpendicular to the surface, irradiation growth to the longitudinal and width directions occurs. An amount of neutron irradiation becomes greater in a position closer to the center of the reactor core, and there arises the difference in irradiation growth amount by the variation of neutron irradiation amount, causing the bow deformation. Randomly orientating <0001> directions of crystals is effective in limiting the irradiation growth. The irradiation growth is a deformation without any change in volume, and even if each of the crystal grains of polycrystalline aggregate is deformed in a particular direction, all the directions of the deformation is random, which can be considered to be equivalent to no deformation as a whole.

For quantitative evaluation of crystal orientation, a method is ordinarily used in which an X-ray diffraction intensity of a particular crystal face is measured by use of a combination of reflected and transmission X-ray diffraction methods, and F value is calculated by equation (1) from the X-ray diffraction intensity measured:

$$F = \int_0^{\pi/2} V(\phi) \cdot \cos^2\phi \cdot d\phi \quad \text{(equation 1)}$$

where $\phi$ is an angle between a particular direction (e.g., a direction perpendicular to a plate surface) and a particular crystal orientation (e.g., <0002> crystal orientation), and $V(\phi)$ is the volume proportion of crystals oriented in the direction $\phi$. Supposing that directions r, t and l are defined to be the normal direction of the plate (tube) surface (Fr), the longitudinal direction of the plate (tube)(Ft), and the widthwise direction of the plate (circumferential direction of the plate)(Fl), respectively, which directions are perpendicular to each other, then the following relationship exists:

$Fr+Ft+Fl=1.0$.

In a case where the crystal orientation is made completely random, the relation, $Fr=Ft=Fl=⅓$, exists.

It is preferred that each of Fr, Ft and Fl is 0.20 to 0.50. Preferably, Fr is 0.25 to 0.50, Fl being 0.20 to 0.35 and Ft is 0.25 to 0.36. Most preferably, each of Fr, Ft and Fl is 0.31 to 0.35.

The Fr value of (0002) crystal plane (equivalent to (0001) plane) of a plate and a tube manufactured by a process in which usual cold working and annealing are repeated is about 0.7, and (0001) crystal orientation is mainly directed in the direction normal to the plate (tube) surface. This state in which <0001> crystal orientation is mainly oriented in the direction normal to the surface is called texture. As shown in FIG. 1 disclosing a relationship between neutron exposure and irradiation elongation, the irradiation elongation is remarkably reduced when the Fl value is not less than 0.23 or preferably not less than 0.25. In a case where the Fl value is 0.30 to 0.35, the elongation is limited to substantially 0 (zero) even in such a high irradiation range as the amount of neutron exposure$\geq 10^{22}$ (n/cm$^2$).

As a means for obtaining a texture in which the Fl value is 0.20 to 0.35, there is a process comprising the steps of heating a zirconium alloy member to a β phase temperature range (a temperature higher than 980° C. in the case of the zircaloy) to thereby sufficiently grow βZr crystal grains, and thereafter quenching the member by water spraying, however, it is necessary to heat the whole member to a uniform temperature. By this treatment, hexagonal αZr crystals transform to cubic βZr crystals and again transform to hexagonal αZr crystals during the course of the cooling. In order to obtain by this heat treatment a texture in which the Fl value is 0.20 to 0.35, it is appropriate to grow βZr crystal grains so that the grain size thereof is not less than 100 μm. For obtaining a texture in which Fl value is not less than 0.20, βZr crystal grains need to be grown to be at least not less than 50 μm but not more than 500 μm in grain size, and preferably not less than 150 μm but not more than 300 μm. The period of time for heating in the β phase temperature range may be shorter in a case where the heating temperature in the β phase temperature range is higher (preferably 1,000 to 1,350° C., more preferably 1,000° to 1,200° C.). The period of time for retention at the maximum temperature may be very short. For example, it is 1.5 to 100 sec., preferably 5 to 60 sec. It is particularly preferable to effect the heating in a range marked with the mark "•" in FIG. 5.

Heating a whole member uniformly can be performed by the following means: the use of a plate member; a width of the heating body is set to be not less than 3 cm, preferably not less than 4.5 cm, more preferably 4.5 to 10 cm (2 turns of high-frequency induction heating coil); the heating is performed while keeping the gap between the heated member and the heating body constant by use of rollers and quenching treatment is performed plural times; and the measurement of the heated part is performed, etc. The gap is 1 to 5 mm, especially the gap of 2 to 3 mm is preferable.

In a case where the heating temperature is inadequate or its retention time is inadequate even if heating is performed in the β phase temperature range, it is impossible to obtain the aimed texture in the whole of the member. To obtain a texture in which crystal orientation is random, it is necessary to sufficiently grow βZr crystal grains having various crystal grain orientations. For this sufficient growth, a temperature or retention time is required to be high or long (not less than 0.8 in terms of P value) enough to grow βZr crystal grains until the grain size becomes at least 50 μm.

As described above, the Fr value varies according to the heat treatment, and the temperature and the retention time are important factors. Accordingly, in order to reduce the Fr value to be not more than 0.50 by heating in the β phase temperature range, it is preferable to set the parameter P obtained by the equation shown above to be not less than 1.5 (βZr crystal grain size of not less than 60 μm). Particularly, the parameter P is preferably 2.5 to 5 (a βZr crystal grain size of 70 to 500 μm). More preferably, it is 3.2 to 5 (a βZr crystal grain size of 100 to 500 μm).

A suitable zirconium based alloy used as a cladding tube, a channel box and a spacer member contains not more than 5 wt % Sn and/or not more than 5 wt % Nb, and not less than 90 wt % (preferably 95 to 98.5 wt %) Zr. Sn and Nb are necessary to increase the strength of Zr. Not more than 5% of Sn and not more than 5% of Nb are required. Preferably, the lower limit of each of Sn and Nb is 0.1%. In the zircaloy, 1 to 2% Sn is preferred, more preferably 1.2 to 1.7% Sn. This alloy may contain not more than 0.5% Fe and not more than 0.5% Cr, or may contain this amount of Cr and not more than 0.2% Ni, or these amounts of Fe and Ni. Particularly, it is preferred for the zircaloy to contain 0.05 to 0.20% Fe or 0.1 to 0.38% Fe, 0.05 to 0.15% Cr, or 0.03 to 0.10% Ni or 0.25% Ni added thereto, or to contain 0.22 to 0.38% Fe, 0.05 to 0.15% Cr and 0.09 to 0.15% Ni. In the latter case, Fe or Ni may be used alone, however, it is preferred to contain both of Fe and Ni. Preferable mixture ratio of (Fe/Ni) is 1.3 to 10.

As examples of the alloys containing Nb, alloys of Zr—0.5 to 2% Nb, Zr—2 to 5% Sn—0.5 to 1.5% Nb—0.5 to 1.5% Mo, Zr—0.5 to 0.15% Sn—0.5 to 1.5% Nb—0.1 to 1.0% Fe, Zr—0.5 to 5.0% Nb—0 to 3.0% Sn—not more than 2% of at least one selected from the group consisting of Fe, Ni, Cr, Ta, Pd, Mo and W are preferable.

In a manufacturing process embodying the present invention, a plate or tube member is successively heated for a desired retention time with an induction coil while moving the member so that the member is heated in the β phase temperature range, and the member is forcibly cooled after the heating. By this heating to the β phase, a structure can be obtained in which <0001> directions are randomly oriented, and high corrosion resistance to high temperature and to high pressure pure water is obtained. Preferably, cooling is performed by spraying water (preferably spraying warm water), cooling speed being 50° to 300° C., preferably 100° to 250° C./sec. Other heating means, such as infrared rays and an electric furnace, may be used. Specifically, it is preferable to prevent deformation due to cooling by reducing the cooling speed for cooling by use of warm water of more than room temperature as a cooling medium for cooling. The temperature is preferably 40° to 80° C.

When heating in the β phase temperature range, it is preferable to restrain the heated member by fixing it with a member having a thermal expansion coefficient larger than that of the Zr based alloy. In particular, in the case of a tubular member, it is preferable to perform heating and cooling while inserting in the interior of the tube a metallic member contacted locally with the inner face of the member to be heated so as to reduce the thermal influence thereon by preventing the whole surfaces of these members from being in contact with each other and while fixing the opposite ends of these members so as to prevent the tubular member from deforming during the heating and cooling. In a case where the retaining member is provided, the heating and cooling can be performed easily. As a restraining member, an austenitic stainless steel such as SUS304, 316, 347, etc. having a larger coefficient of thermal expansion than Zr based alloy is preferred.

The heating treatment in the β range may be performed regarding either plate members or a tubular member. In case of the plate members, it is formed into a tube shape after the heat treatment in the β range and is bonded together by welding.

Subsequently to the β phase heat treatment, annealing for uniformly heating the whole of the member is performed. The annealing is effected at 500° to 650° C. (preferably 550° to 640° C.). For this annealing as well, it is preferable to use the restraining member to restrain the heated member, whereby the tubular member can be suitably shaped. These heat treatments are effected in a non-oxidizing atmosphere, particularly the treatment in Ar being preferred.

After the final heat treatment, an oxidized layer on the surface is removed by sand blasting and pickling. After removing the oxidized layer, the surface is oxidized by an autoclave to form a stable oxidized coating thereon, thereby finishing the product. End portions of screw holes, etc. for fixing purposes at both of the ends are cut off for the use of the product.

A channel box embodying the present invention is formed by the steps of abutting two U-shaped members, plasma-welding the abutting portions to form an angular tube, and flattening the welded portion, and is thereafter used. For the heat treatment of this angular tube, it is preferable to insert an X-shaped restraining member therein. The heat treatment according to the present invention may be applied to any one of the states of a plate, a U-shape and a angular tube obtained after welding. Plate members heat-treated are bent to have a U-shape (channel-shape) and then are welded into a usable angular tube.

According to the present invention, there is provided an atomic power plant having a steam turbine actuated by thermal output obtained by atomic fuels contained in a reactor pressure vessel, and a generator is driven by the rotation of the turbine so as to generate an electric output, the thermal output of the reactor being not less than 3200 MW, pressure in the reactor being not less than 7.0 MPa, the temperature of the reactor being not less than 288° C., and an electric output being not less than 1100 MW, or alternatively the thermal output of the atomic reactor is not less than 4300 MW, pressure in the reactor being not less than 7.2 MPa, the temperature of the reactor being not less than 288° C., and an electric output being not less than 1500 MW, to which power plant the fuel assembly is applied.

BRIEF DESCRIPTION OF THE DRAWINGS

FIG. 8 is a perspective structural view showing the channel box manufacturing steps;

DETAILED DESCRIPTION OF THE PREFERRED EMBODIMENTS

Embodiment 1

Figure 1:
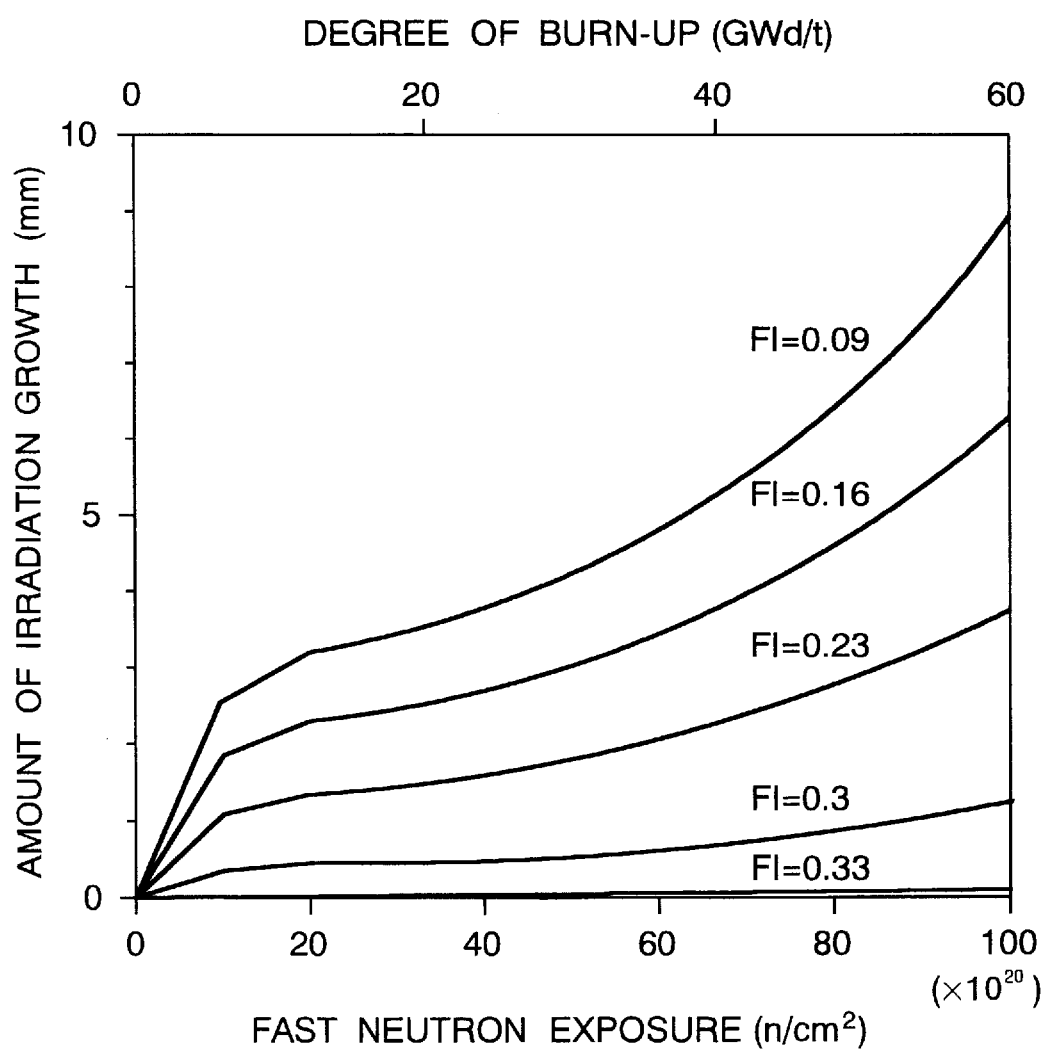
FIG. 1 is a graph showing influences of fast neutron exposure and of Fl value on irradiation growth strain.

Three kinds of Zircaloys used as zirconium alloy plate members having alloy compositions shown in Table 1 were used. They were heat-treated under the conditions shown in Table 2.

TABLE 1

| Alloy name | Alloy element | | | | | | | |
|---|---|---|---|---|---|---|---|---|
| | Sn | Nb | Fe | Cr | Ni | Mo | O | Zr |
| Zircaloy-4 | 1.50 | — | 0.21 | 0.10 | — | — | 0.12 | bal. |
| Zircaloy-2 | 1.50 | — | 0.15 | 0.10 | 0.10 | — | 0.12 | bal. |
| Zircaloy-C | 1.50 | — | 0.25 | 0.10 | 0.10 | — | 0.12 | bal. |

TABLE 2

| Heat treatment No. | Max. heating temperature (°C.) | Retention time (sec.) at Max. heating temperature | Cooling speed (0° C./sec.) | P |
|---|---|---|---|---|
| 1 | no heat treatment | | | — |
| 2 | 900(α +β) | 600 | 300 | — |
| 3 | 1000(β) | 60 | 300 | 2.31 |

TABLE 2-continued

| Heat treatment No. | Max. heating temperature (°C.) | Retention time (sec.) at Max. heating temperature | Cooling speed (0° C./sec.) | P |
|---|---|---|---|---|
| 4 | 1000(β) | 600 | 300 | 3.61 |
| 5 | 1200(β) | 60 | 250 | 4.16 |
| 6 | 1000(β) | 5 | 300 | 0.91 |

Each of the alloys was prepared as a plate have been formed to have a thickness of 2.5 mm by the repetition of both cold rolling and annealing performed at 650° C. for two hours before being used. Heat treatment 2 to 4 shown in Table 2 were performed by the steps of heating the plate member having a width of 280 mm and a length of 4 m by means of a high-frequency induction coil, and cooling it with water circumferentially and uniformly by use of coil-like cooling nozzles wound thereunder in the same manner as the high-frequency induction coil. The parameter P was calculated by the above-mentioned equation. In order to heat the whole plate width uniformly, the upper and lower parts of the coil were fixed by rollers to prevent the plate from moving in right-and-left and back-and-forth directions so that the gap between the plate and the coil does not change. The coil has 3 turns, one turn having not less that 1 heating width, so that the width of the heating zone becomes not less than 4 cm, preferably 1.5 to 2 cm, which enabled the plate to have the uniformity of heating temperature. Warm water having the temperature of not less than 40° C. was used for cooling, which prevented deformation from occurring during cooling and achieved uniform heating. No deformation of the plate member in this embodiment was found by visual inspection.

Table 3 shows the results of F values measurement with respect to (0002) plane (parallel to (0001) plane) and (1010) plane (vertical to (0001) plane) of heat-treated members 1 to 6. The F values measurement was performed by the combination of the reflected/transmission X-ray diffraction methods mentioned above. In the case of a tubular member, Fr the is orientation in a direction perpendicular to the surface thereof, Fl being the orientation in the longitudinal direction thereof, and Ft is the orientation in the circumferential direction thereof.

TABLE 3

| Heat treatment No. | (0002) plane | | | (1010) plane | | |
|---|---|---|---|---|---|---|
| | Fr | Fl | Ft | Fr | Fl | Ft |
| 1 | 0.672 | 0.108 | 0.220 | 0.158 | 0.448 | 0.393 |
| 2 | 0.666 | 0.124 | 0.210 | 0.156 | 0.445 | 0.398 |
| 3 | 0.414 | 0.295 | 0.292 | 0.301 | 0.354 | 0.345 |
| 4 | 0.335 | 0.352 | 0.318 | 0.325 | 0.329 | 0.344 |
| 5 | 0.336 | 0.334 | 0.330 | 0.330 | 0.335 | 0.335 |
| 6 | 0.470 | 0.253 | 0.277 | 0.209 | 0.401 | 0.390 |

In the case of the plate (heat treatment No. 1) manufactured by repeating with usual cold rolling and annealing, the Fr value of the (0002) plane is large, about 0.7, while the Fr value of the (1010) face is small (about 0.15) in comparison with Fl and Ft. From these results shown in Table 3, it can be understood that (0002) plane is oriented generally parallel to the plate surface. The F values of the member (heat treatment No. 2) heated to the α+β phase temperature range and cooled is generally equal to that of the as-supplied member (heat treatment No. 1). Thus, it is understood that the texture is not changed by heating to and cooling from the α+β phase temperature range. In the cases of heating in the β phase temperature range (1000° C.) for 1 minute and 5 seconds followed by cooling (heat treatment Nos. 3 and 6), reduction of Fr value and increases in the Fl and Ft values of the (0002) plane, and an increase in the Fr value and reductions in the Fl and Ft values of the (1010) plane are observed in comparison with the as-supplied member, and the crystal orientation is made random. However, it does not satisfy the Fr value $\leq 0.35$, which is an aimed value enabling use in such high irradiation range as the amount of neutron exposure $\geq 10^{22}$ (n/cm$^2$). In the cases of the retention time at 1,000° C. for 10 minutes (heat treatment No. 4) and increasing the heating temperature to 1,200° C. (heat treatment No. 5), each of the F values of (0002) plane and (1010) plane is about 0.33, and the it is understood that the crystal orientation is made substantially completely random. As described above, neither bow deformation nor elongation deformation is caused in the members processed by heat treatments 4 and 5, even if the non-uniformity of neutron exposure inside the member exists.

FIG. 1 is a graph showing a relationship between fast neutron exposure and an amount of irradiation growth. As shown in FIG. 1, the strain is abruptly increased as an amount of neutron exposure is increased in a case where the Fl value is not more than 0.3, but the strain is saturated and is not increased in another case where the Fl value exceeds 0.3. Particularly, in the case of Fl=0.33, <0001> crystal orientation is substantially random, so that strains in the normal direction, in the longitudinal direction and in the direction of the plate thickness offset each other among crystals. Namely the strain is substantially naught, that is, is not more than 1 mm in the case of 4 m length and 60 GWd/t degree of burn-up. In the case of Fl=0.3, an amount of irradiation growth is as small as not more than 2 mm till $10^{22}$ n/cm$^2$ neutron exposure, but the amount of irradiation growth is gradually increased in another case of Fl value larger than 0.3 as an amount of neutron exposure increases.

Figure 2:
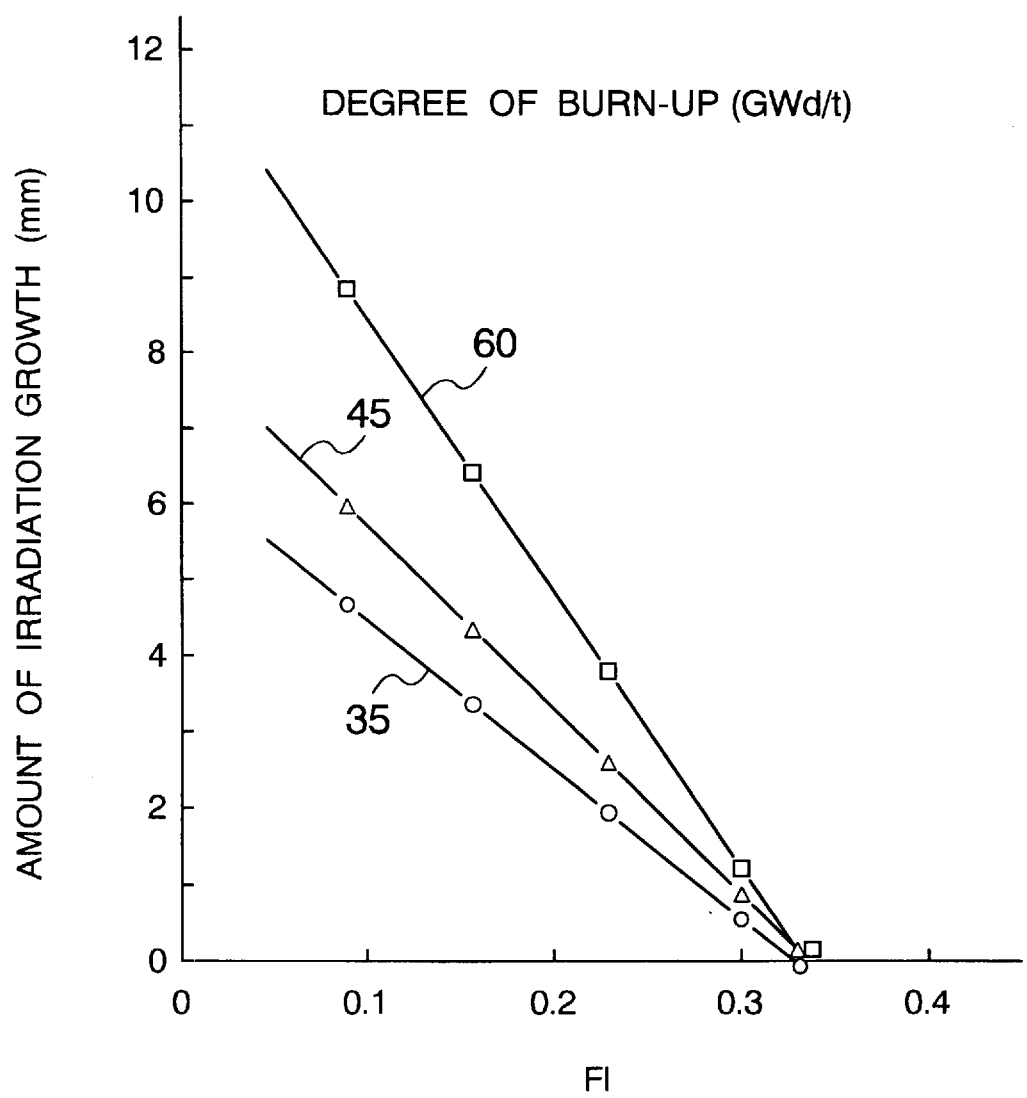
FIG. 2 is a graph of a relationship between the irradiation growth strain and the Fl value.

FIG. 2 is a graph showing the relationship between the Fl value and an amount of irradiation growth caused by the irradiation corresponding to the degree of burn-up of 36.45 and 60 GWd/t. With the decrease of the Fl value, the amount of strain is increased abruptly. Particularly, an amount of irradiation growth is zero when Fl=0.33, which value is remarkably small, that is, not more than about 1/7 in comparison with that of Fl=0.3. Also, this value is remarkably small when Fl=0.3, that is, about 1/3 or less in comparison with that of Fl=0.23. However, in the case of Fl=0.23, it is about half that of Fl=0.16. In the case of Fl=0.16, about half that of Fl=0.09.

Roundish crystal grains observed in the metallic structure of each of the heat-treated member Nos. 1, 3 and 4 are αZr grains. No βZr crystal grains were observed. Also, the observed polygon-shaped crystal grains are βZr crystal grains formed during the heating and keeping in the β phase temperature range. It is understood that, as the retention time at 1000° C. is increased from 1 to 10 minutes, the grain size of βZr crystal grows greatly. A layered or acicular structure found in the βZr crystal grains is formed when the βZr is again transformed into αZr during the cooling process, and is not βZr grain boundary.

Figure 3:
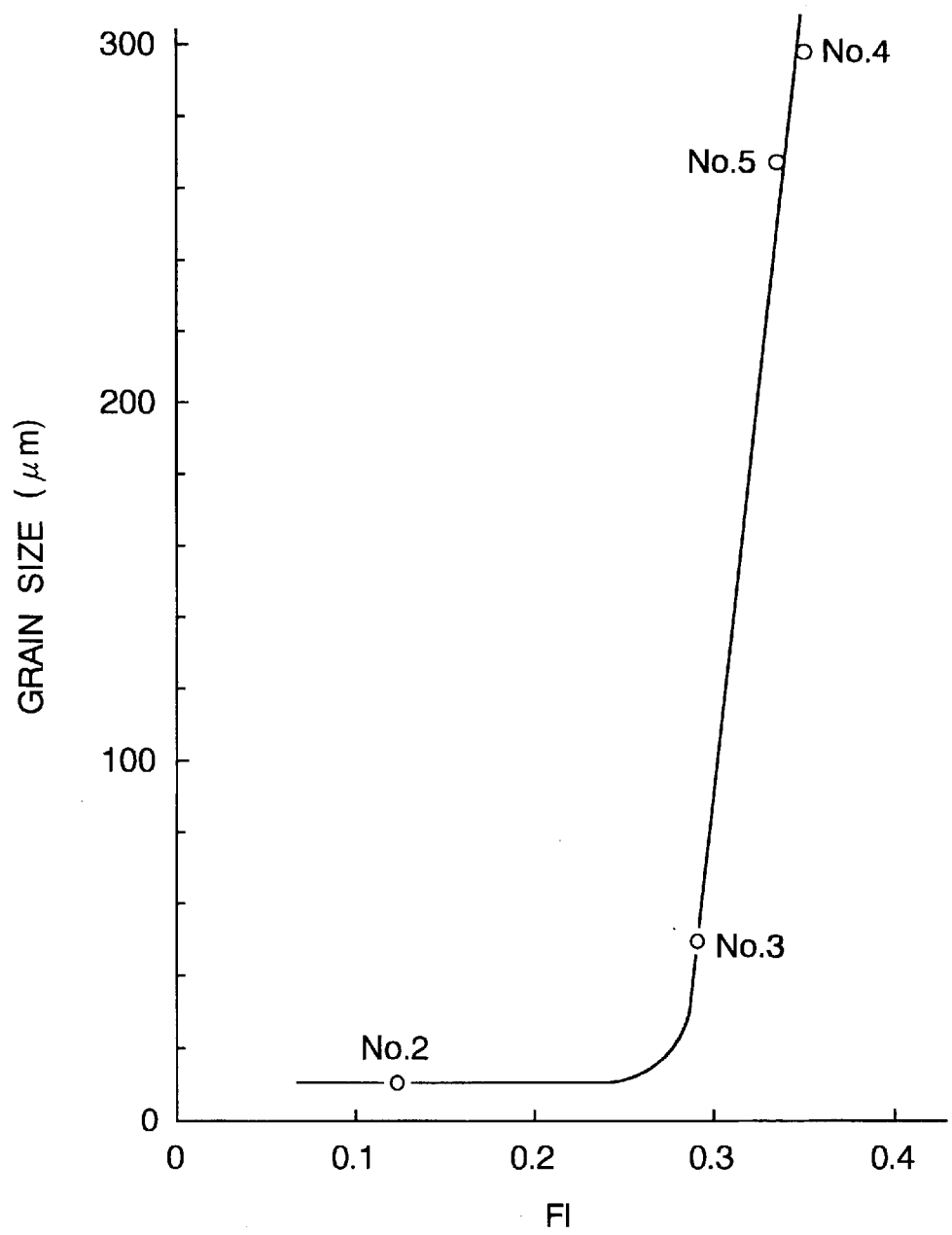
FIG. 3 is a graph of a relationship between the Fl value and the βZr crystal grain size.

FIG. 3 shows a relationship between the βZr crystal grain size and the Fl value of the (0002) plane. It is understood that a texture having the Fl value of not more than 0.33 is formed by the growth of βZr crystal grains of not less than 200 μm.

It is possible to make the crystal orientation of the (0002) plane random by growing crystal grains, however, the degree of randomness of this orientation is about 75% when the Fl value is 0.30, at which case the grain size is about 100 μm. When the grain size exceeds 150 μm, the degree of randomness is about not less than about 80%, and the Fl value becomes 0.310. Furthermore, when the Fe value is 0.33, the degree of randomness is about not less than about 90%, the grain size being about not less than 250 μm at this case.

Figure 4:
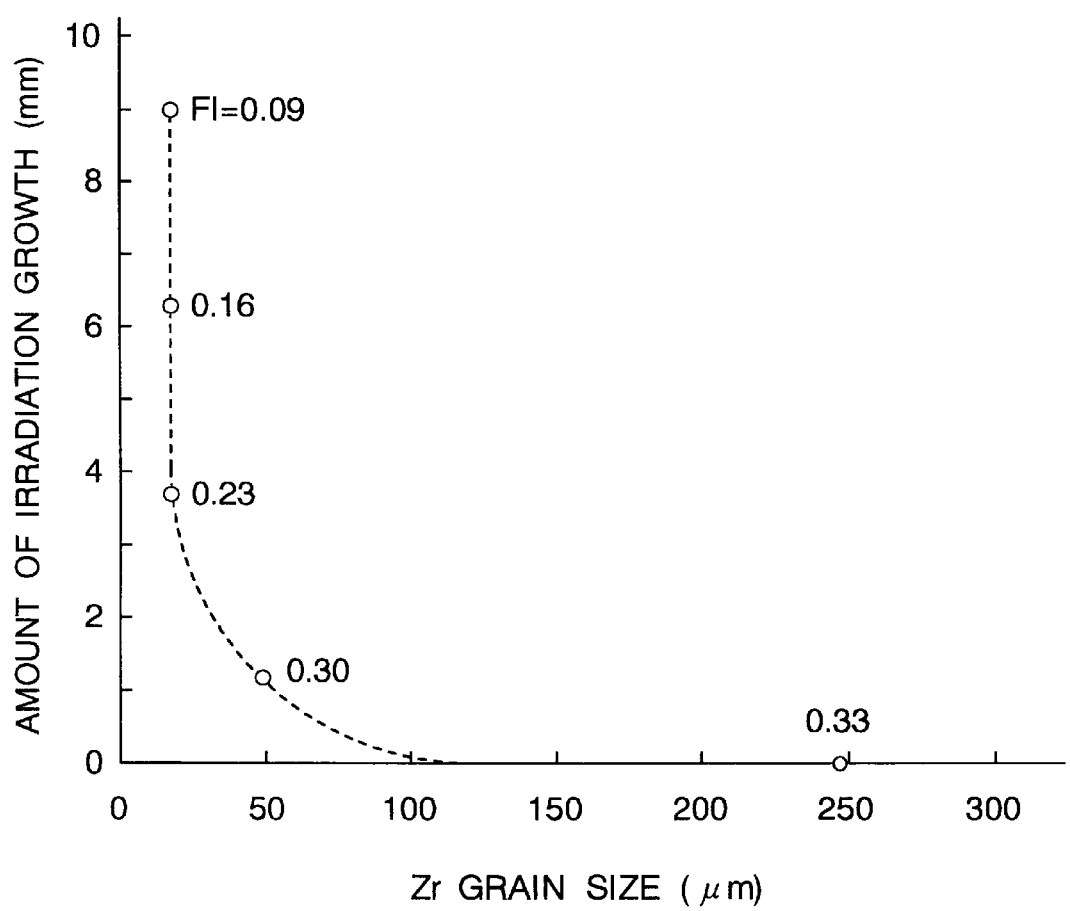
FIG. 4 is a graph of a relationship between the irradiation growth strain and the Zr crystal grain size.

FIG. 4 is a graph showing the relationship between the βZr crystal grain size and an amount of irradiation growth by fast neutron irradiation-corresponding to 60 GWd/t degree of burn-up. From FIG. 4, when the grain size is not less than 90 μm, the growth amount is zero which is remarkably small. When it is 10 μm, the growth amount is not more than 2 mm. Particularly, when it is not more than 35 μm, its growth amount becomes larger abruptly. A superior characteristic is obtained in a case where its growth amount is not more than 1 mm while the grain size is not less than 60 μm.

From the relationship between the parameter P=(3.55+logt)×log(T−980) and the irradiation growth strain, particularly in the case of the heat treatment at 1000° C., the strain of irradiation growth is abruptly reduced when P exceeds 0.5, is gradually further reduced as P is changed from 0.5 to 3.5, and is approximately constant and close to zero when P is not less than 3.5. When P is smaller than 3.5, irradiation growth occurs. When P is 3.5 or greater, substantially no irradiation growth occurs. The effect of limiting the irradiation growth strain is sufficiently high when P is not less than 1.5. Preferably, P is set to be 3.2 to 5.

Figure 5:
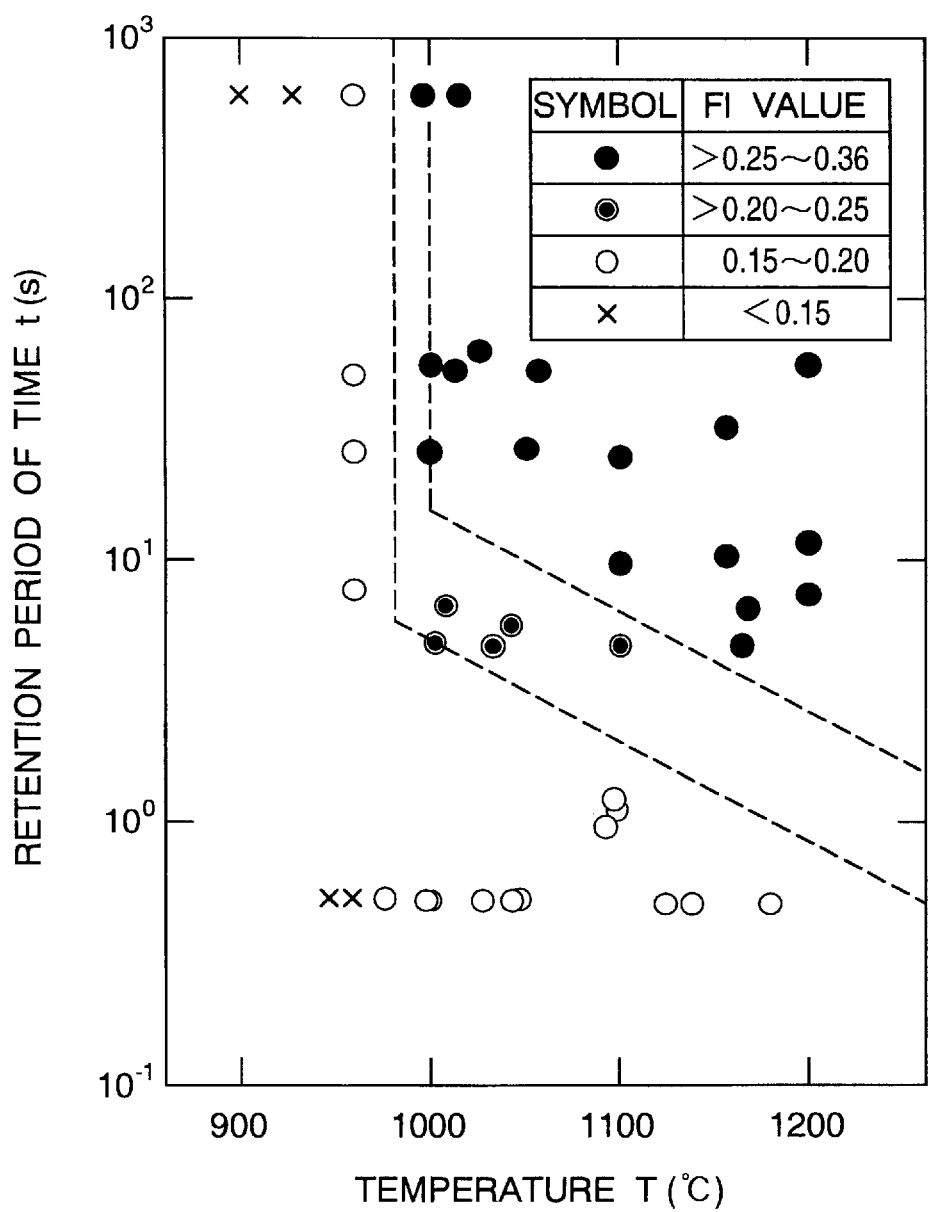
FIG. 5 is a graph of a relationship among the irradiation growth strain, the quenching temperature and the retention period of time.

FIG. 5 is a graph showing a relation between the Fl value of alloys shown in Tables 1 and 4, each temperature and the retention time. As shown in FIG. 5, when the temperature is less than 980° C., the Fl value is not more than 0.20 and it is difficult to make <0002> crystal orientation random. However, by heating at 980° C. for 11 sec. (10.5 sec. at 1000° C.) or longer or at 1240° C. or higher for 1.1 sec. or longer, i.e., heating under conditions as defined on or above a line connecting the points indicating these temperatures and times, the heat-treated member can have an Fl value exceeding 0.25 and a higher degree of randomness. Furthermore, by heating at 980° C. or higher for 6 sec. or longer or at 1240° C. or higher for 6 sec. or longer, i.e. heating under conditions as defined on or above the line connecting them, the heat-treated member can have an Fl value greater than 0.2 but not more than 0.25. In the case of heating under conditions defined below this line, the Fl value is not more than 0.20, the degree of randomness is small, and the effect of limiting the elongation is small.

TABLE 4

| Alloy name | Alloy element (wt %) | | | | | | Fe/Ni ratio |
| --- | --- | --- | --- | --- | --- | --- | --- |
| | Sn | Fe | Cr | Ni | O | Zr | |
| Zircaloy-2 | 1.50 | 0.15 | 0.10 | 0.05 | 0.11 | bal. | 3.0 |
| Zircaloy-A | 1.50 | 0.23 | 0.10 | 0.05 | 0.11 | bal. | 4.6 |
| Zircaloy-B | 1.50 | 0.23 | 0.10 | 0.09 | 0.11 | bal. | 2.6 |
| Zircaloy-C | 1.50 | 0.13 | 0.10 | 0.09 | 0.11 | bal. | 1.4 |
| Zircaloy-D | 1.50 | 1.10 | — | 0.08 | 0.11 | bal. | 13.8 |

As described above, if crystal orientation is made completely random, no irradiation growth strain by neutron irradiation occurs. However, an actual channel box is a quadrilateral tubular body and has one side length of 140 mm, and particularly it is difficult to form it so that the F values at the opposed faces are the completely same. The above-mentioned irradiation growth strain is caused by the difference of F value, but what is the problem regarding the channel box is bow. The bow is caused particularly by the difference in F values of the opposed faces. The amount of the bow was measured by providing a very slight difference in F value between the opposed faces by changing the above-mentioned heat treatment condition.

Figure 6:
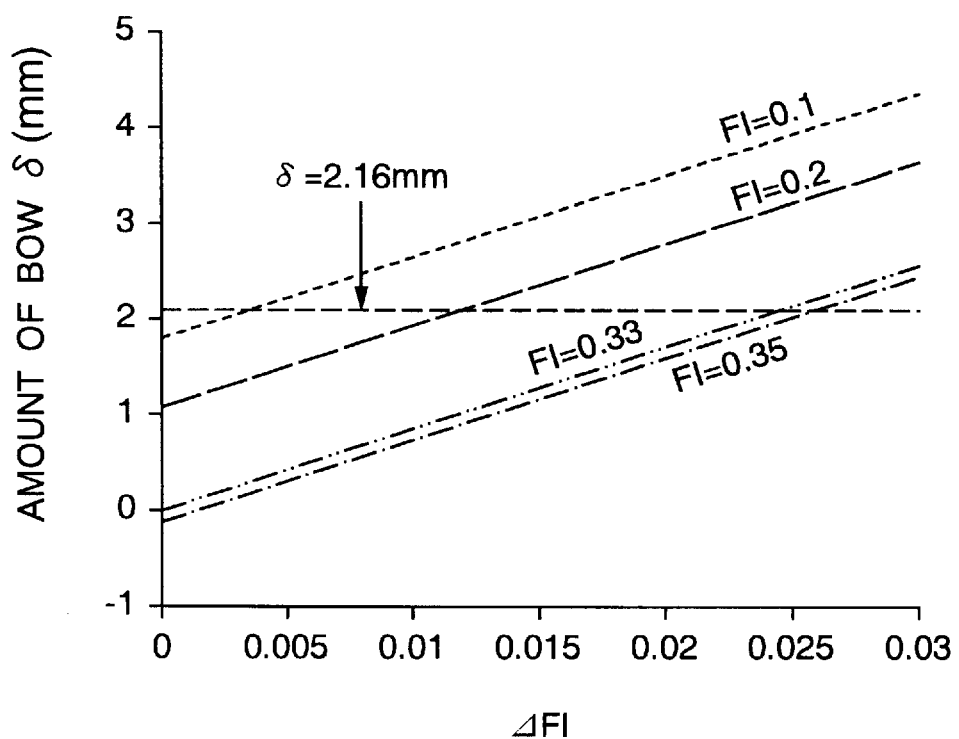
FIG. 6 is a graph of a relationship between ΔFl value and an amount of bow.

FIG. 6 is a graph showing the F value (Fl) with respect to longitudinal direction of 4 m length and the amount of bow caused due to the difference of ΔFl in the Fl value between the opposed faces. The amount of the bow is a value occurring at 35 GWd/t degree of burn-up, and a limiting value of 2.16 mm of the bow is shown as an tolerance value at the gap defined between a channel box and a control rod. As shown by the graph, it is understood that ΔFl value between the opposed faces corresponding to the bow of 2.16 mm, which ΔFl value is obtained regarding each of the Fl values, is increased as the degree of randomness of crystal orientation increases. Particularly, as for ΔFl, it is preferred to obtain Fl by the steps of uniformly dividing the channel box face into a plurality of opposing sections, preferably 4 or more sections, and obtaining an average value of Fl regarding each of the opposing sections so that the difference in the average Fl values is measured.

Figure 7:
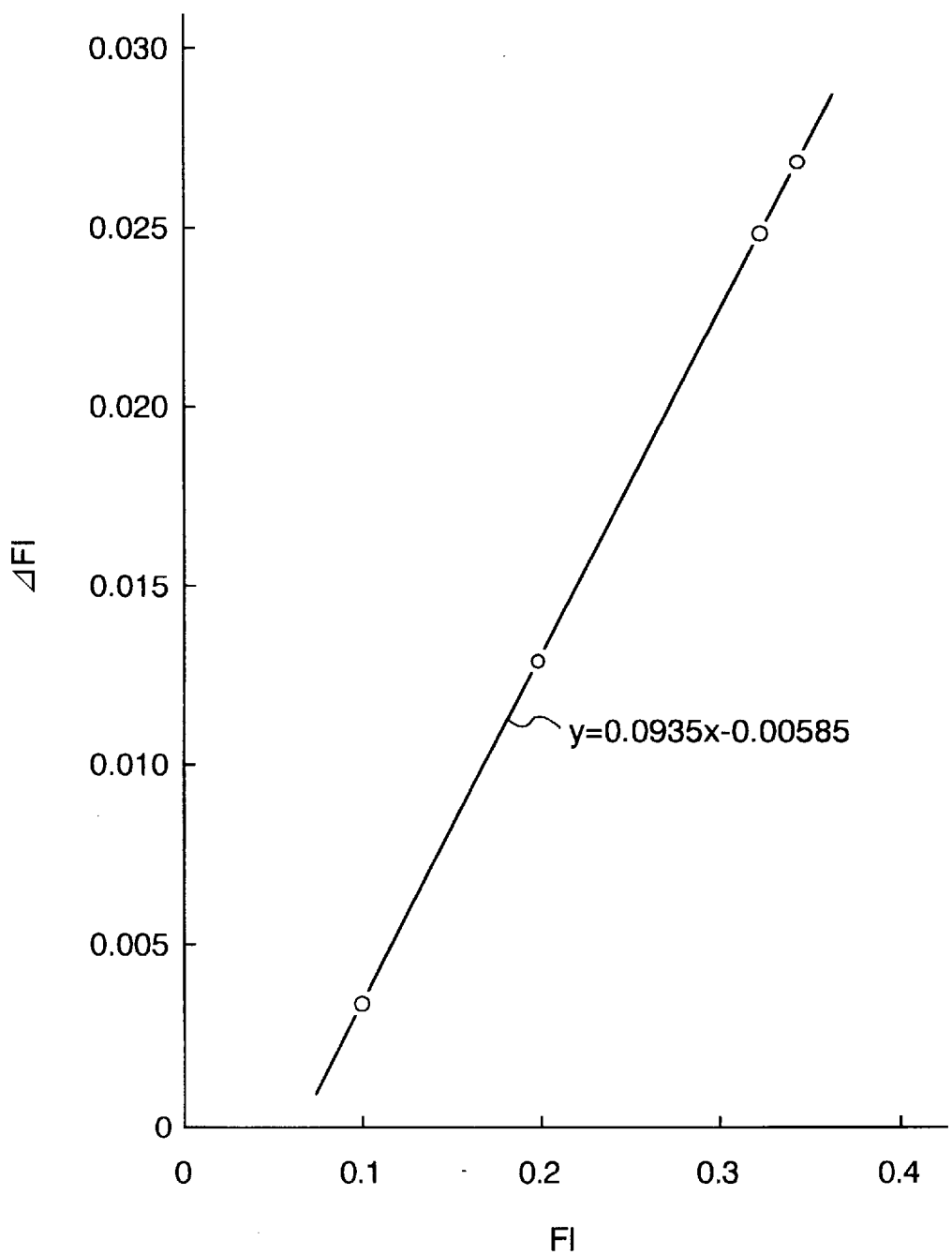
FIG. 7 is a graph of a relationship between Fl value and ΔFl value.

FIG. 7 is a graph showing a relationship between the Fl value and the difference in Fl value (ΔFl) between the opposed faces in the circumferential direction with respect to the threshhold value of the bow at the degree of burn-up of 35 Gwd/t. A tolerance ΔFl value is proportional to the Fl value, and the graph is shown as the equation, Y=0.0935×−0.00585, where an ordinate ΔFe is y and an abscissa Fl is x. By effecting uniform heat treatment so that the factors exist under the equation, deformation can be within the threshhold value. In order to perform heating at a uniform temperature as a whole regarding each of a plate thickness, a width and a length required for a channel box in the present invention, it is necessary to optimize turn number of the induction heating coil, a width of the heating zone and the cooling rate, and to make uniform the gap between a plate and a coil, as described above.

FIG. 8 is a diagram showing a manufacturing process from a plate member to a final product. The plate member in this process uses the above-mentioned one, is heated by high-frequency induction coil and is cooled by use of a water-cooled nozzle provided at its lower position. The coil and a water-cooled nozzle are fixed, while the plate member is continuously moved upward. The measurement of heating temperature was performed at a space just before the water-cooled nozzle and just after the heating of the plate member directly by use of an optical pyrometer. A retention period of time of heating was controlled by adjusting a moving speed of the plate member. The temperature difference between the end and middle of the plate in the present embodiment was not more than 10° C., and several combinations of heating temperature of 1050° to 1150° C. and a retention period of time of 3 to 20 sec. was adopted. Warm water having a temperature of 40° to 80° C. was used as cooling water, and warm water of almost constant temperature was used regarding cooling of one time. After quenching, cold rolling and subsequent annealing at 600° C. for two hours were performed. Then, a plate member was worked by cold bending to have a channel-shaped form as shown in the drawing and was annealed at 600° C. for two hours thereafter. An angular, tubular body was formed by the steps of plasma-welding for obtaining a quadrilateral tube, flattening through the leveling of weld beads and machining, annealing by heating at 600° C.×2 hours while inserting a cross-shaped mandrel made of SUS304 into the tubular body, straightening of the shape, sand-blasting oxidized scale formed by the abovementioned heat treatment, removing an inner and outer surface by pickling, surface-finishing such as degreasing, etc. and autoclave-treating by steam, which leads to a final product. An inspection of randomness regarding crystal orientation was made after quenching by use of a supersonic wave. A crystal grain size according to the present embodiment was about 300 μm, the F value was equivalent to that of No. 5 in Table 3, and ΔFl was not more than 0.010 between the opposed faces.

Further, in a channel box there occurs creep deformation due to water pressure, which causes blister deformation. The blister deformation occurs when the degree of burn-up increases further and the amounts of the bow and blister must be taken into consideration particularly at 60 GWd/t.

Table 5 shows a dependency of an amount of the bow (mm) of the channel box on Fl and ΔFl at 60 GWd/t. In considering the bulge amount, an amount of the bow is preferably not more than 1.17 mm, preferably Fl being 0.30 to 0.35 and ΔFl being not more than 0.006.

TABLE 5

| Fl | ΔFl | | | | | | |
|---|---|---|---|---|---|---|---|
|  | 0 | 0.002 | 0.004 | 0.005 | 0.006 | 0.008 | 0.01 |
| 0.1 | 3.870 | 4.188 | 4.507 | 4.666 | 4.825 | 5.143 | 5.462 |
| 0.2 | 2.211 | 2.530 | 2.848 | 3.007 | 3.167 | 3.485 | 3.803 |
| 0.33 | 0.055 | 0.374 | 0.692 | 0.851 | 1.010 | 1.329 | 1.647 |
| 0.35 | −0.276 | 0.042 | 0.360 | 0.519 | 0.679 | 0.997 | 1.315 |

Degree of burn-up: 60 GWd/t

Embodiment 2

Figure 9:
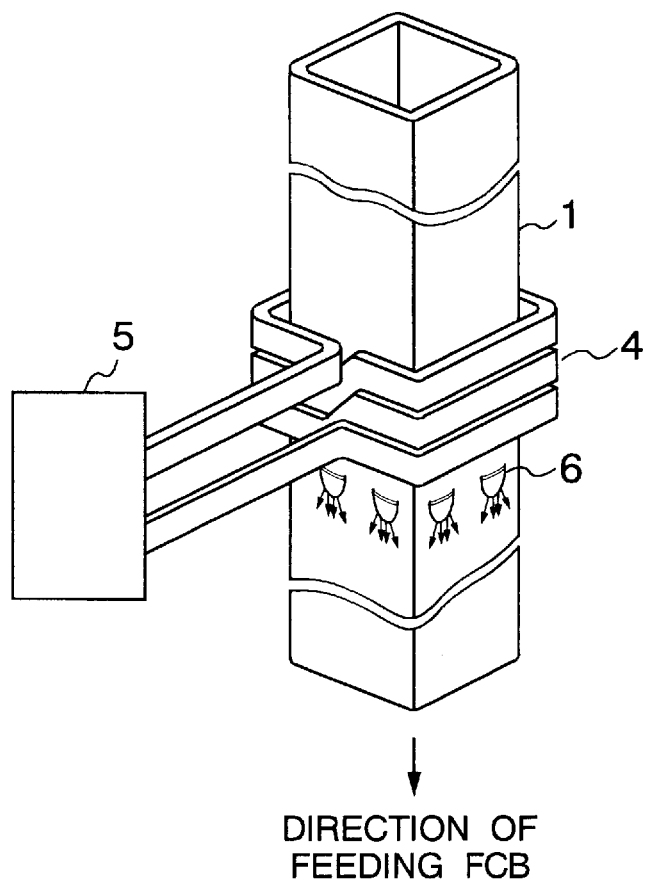
FIG. 9 is a perspective structural view showing apparatus for quenching the channel box.

FIG. 9 shows a perspective view of apparatus for quenching a channel box embodying the present invention. Two plate members as-supplied (that is, subjected to no heat treatment) of Zircaloy C described with respect to Embodiment 1 were worked by cold bending into two channel-shaped members to thereby have a length of 4 m and a thickness of 2.5 mm. These channel-shaped members were plasma-welded into a channel box 1 having a quadrilateral, angular tube having one outer side dimension of 140 mm. Irregularities on welded portions were finished to be flat. This channel box 1 was thereafter heated to the β phase temperature range by a high-frequency power source 5 and was quenched by warm cooling water sprayed through water spray nozzles 6 for cooling which are located immediately below a high-frequency induction heating coil 4. In order that the channel box 1 does not move in any direction, there were provided rollers at the upper part of the high-frequency heating coil 4 and at the lower part of water spray nozzles 6 for cooling, and the channel box 1 was continuously moved as shown by an arrow while the gap between the high-frequency induction heating coil 4 and the channel box 1 is kept constant during the heating and cooling. The channel box 1 was passed through the coil at a constant speed from upward to downward directions to thereby complete the entire heat-treatment, the channel box feed speed and the output of the high-frequency power source 5 being controlled so that the heating temperature becomes 1000° C. with a retention period of time of 10 sec. After the heat treatment, test pieces having a width of 40 mm and a length of 40 mn were cut out and the F values thereof were measured by the X-ray diffraction method. FIG. 6 shows the results of this measurement. The parameter P is 2.07 in the case of heating at 1100° C. The difference in the Fl between the opposed faces in the present embodiment was very small, that is, not more than 0.015 across the total length. In this embodiment, the heat treatment was made one time.

However, ΔFl value can be further reduced to not more than 0.010 by repeating the heat treatment two times under the substantially same conditions while changing a relative position between the coil and the channel and while performing the movement in a direction reverse to that of the first heat treatment, in which the total period of time is set to be equal. ΔFl value can be reduced further by effecting the heat treatment four times while changing the relative position.

TABLE 6

| (0002) plane | | |
|---|---|---|
| Fr | Fl | Ft |
| 0.333 | 0.333 | 0.334 |

As can be understood from Table 6, each of the F values was reduced to ⅓ and the crystal orientation was made completely random.

As a result of the fast neutron irradiation test thereof, the strain caused by irradiation at $3 \times 10^{22}$ n/cm² was about not more than $0.3 \times 10^{-4}$ which was very small. The crystal grain sizes of these samples were 250 μm.

After this heat treatment, there were effected sand blasting and pickling to remove an oxidized layer formed on the surface thereof and thereafter an autoclave treatment using water vapor was effected.

Figure 10:
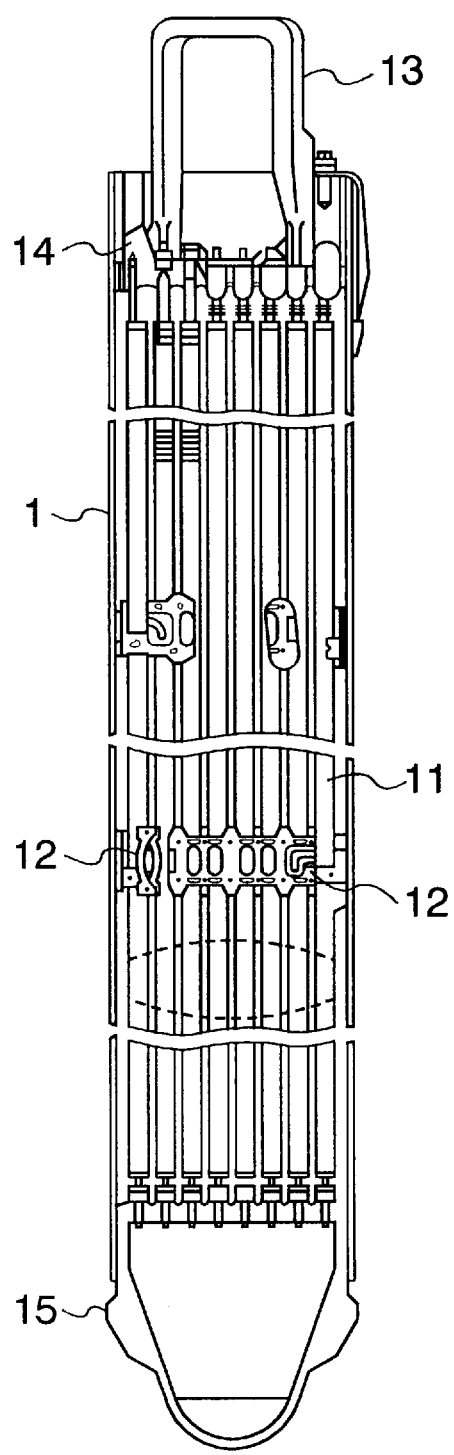
FIG. 10 is a partial, cross-sectional view of the fuel assembly.

FIG. 10 is a partial, sectional view of a BWR fuel assembly using an angular tube manufactured in the above-mentioned manner.

The BWR fuel assembly comprises, as illustrated, a multiplicity of fuel rods 11, spacers 12 for maintaining the fuel rods with a pre-determined interval, a tubular channel box 1 of an angular shape accommodating these rods and spacers, upper and lower tie plates 14 and 15 for supporting both ends of the fuel rods 11 containing fuel pellets in a fuel cladding tube, and a handle 13 for carrying the whole of the fuel assembly.

This fuel assembly is manufactured by a complicated manufacturing process and each of the structures is assembled by welding.

The channel box 1 containing the fuels receives therein the fuel rods 11 assembled through the fuel spacers and is used while fixing the fuel rods with the upper and lower tie plates 14 and 15. The channel box has the shape of an angular tube formed by plasma-welding two channel-shaped plates as described above. This channel box serves to forcibly lead high temperature water and water vapor generated at the fuel rods to the upper position during plant operation, and it is used for a long period of time while always receiving such stress as the angular tube tends to expand outwardly. The channel box for the fuel assembly is exposed to high-temperature, high-pressure core water and is subjected to neutron irradiation during the use thereof. Also, it receives an internal pressure because the pressure in the angular tube is higher than the external pressure. Thus, the channel box needs to have both corrosion resistance in a high-temperature and high-pressure environment and high creep deformation resistance under neutron irradiation.

Zirconium based alloys usually have high corrosion resistance and a small neutron absorption sectional area. Because of these characteristics, they are suitable for materials of a fuel assembly for an atomic reactor and are used for a fuel cladding tube, a channel box 1 and a spacer 12 all constituting the fuel assembly. As a specific zirconium based alloy used in this embodiment, Zircaloy 2 (1.2 to 1.7 wt. % Sn, 0.07 to 0.2 wt % Fe, 0.05 to 0.15 Wt % Cr, 0.03 to 0.08 wt % Ni and the balance Zr) was used for the fuel cladding tubes and spacers. For these members, zirconium based alloys containing 1.2 to 1.7 wt % Sn, 0.21 to 0.50 wt % Fe and 0.03 to 0.15 wt % Ni or the alloy containing 0.05 to 0.15 wt % Cr in addition to these constituents are preferable because they have high corrosion resistance and low hydrogen absorption for the use of a period of time longer than that of not less than 45 GWd/t neutron exposure, the same being applied to a channel box. Also, any one of Zr based alloy containing 0.5 to 2 wt % Nb; Zr—1 to 5 wt % Sn—0.5 to 1.5 wt % Nb—0.5 to 1.5 wt % Mo alloy; Zr—0.5 to 1.5 wt % Sn—0.5 to 1.5 wt % Nb—0.1 to 1.0 wt % Fe alloy; and Zr—Nb (0.5 to 5.0 wt %)—Sn (0 to 3.0 wt %) any one selected from the group consisting of Fe, Ni, Cr, Ta, Pd, Mo and W (not more than 2 wt %) alloy is usable. The Zircaloy alloy is used for the cladding tubes, the channel box, and spacers in a boiling water reactor. However, since local oxidation (nodular corrosion) is apt to occur, in particular, in the cladding tubes, only the outer surface was quenched from the $\alpha+\beta$ phase or from the $\beta$ phase at a stage selected in the period from final hot working to final cold rolling exclusive. The temperature of heating for quenching is 825° to 1100° C., and the retention time is preferably within 1 minute, more preferably 3 to 30 sec. This heating is effected in a continuous manner by use of an induction coil, and cooling is effected by spraying water subsequently to the heating. Preferably, for cladding tubes, the Fr value of <0001> orientation perpendicular to the tube surface is set to be not less than 0.66. In the quenching, the temperature and period of time are controlled so as to prevent the crystal orientation from becoming random.

The fuel assemblies obtained from this embodiment were set along the outer periphery of the reactor core and were subjected to a 2-cycle test (for two years). After measuring an amount of bow after taking-out the channel box, there occurred no bow at all. The degree of burn-up was about 16.6 GWd/t at the 2-cycle test.

According to the present invention, it is apparent that an amount of bow becomes very small even at the degree of burn-up of not less than 45 GWd/t as well as at the degree of burn-up not less than 32 GWd/t. In this case, the channel box can be again used in such a 2-cycle manner as a clad attached to the surface is removed and as the fuel is changed for the reuse of the channel box. Since the amount of the bow is small, it can be used in the same position in the core as that of the previous use. It is also preferable to apply the same heat treatment and orientation to the cladding tubes formed of the above-mentioned alloys other than the Zircaloy alloy.

It is apparent that, by suppressing both deformation caused due to irradiation and bulge deformation caused due to thermal creep deformation at the same time, leakage radiation from the gap between the lower tie plate and the channel box is reduced, and a change of leakage radiation dose which change occurs with the lapse of time, can be decreased.

Embodiment 3

Figure 11A:
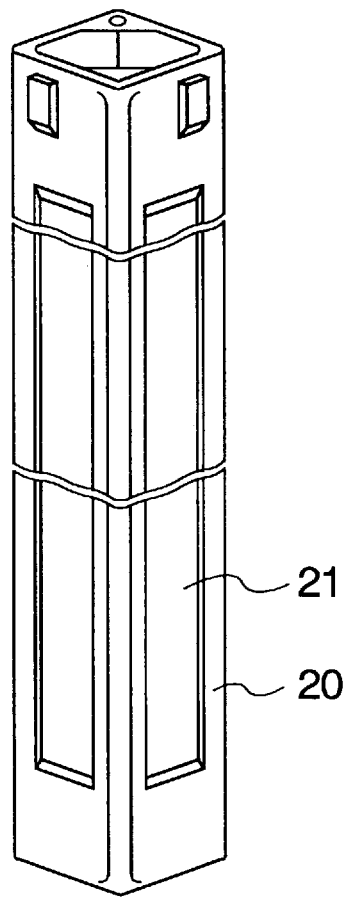
FIGS. 11A to 11C are perspective and cross-sectional views of the channel box.
Figure 11B:
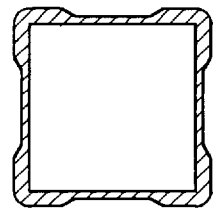
Figure 11C:
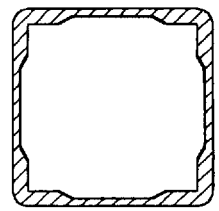
Figure 12:
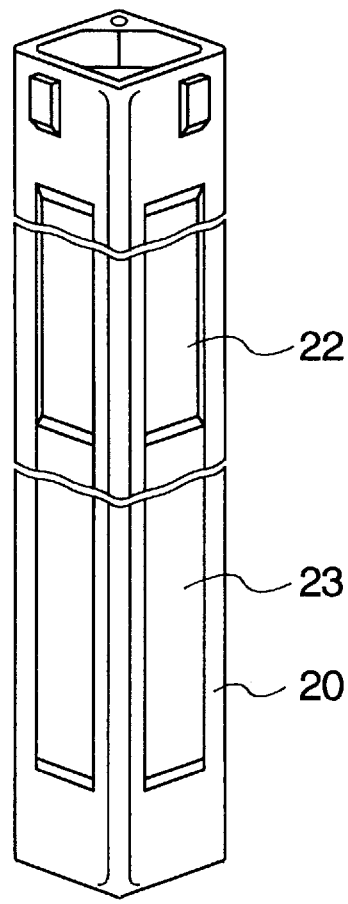
FIG. 12 is a perspective view of the channel box.

The plate thickness of each of the channel boxes in the above-mentioned Embodiments 1 and 2 was made to have the same thickness as a whole. In the case of the present embodiment, as shown in FIG. 11 and FIG. 12, each of the corners was made to be thicker in thickness than the side portion, the heat treatment according to the present invention being applied to a channel box having this thickness relation. The channel box shown in FIG. 11 and FIG. 12 was heat-treated, after the abovementioned quenching treatment, while inserting a mandrel made of SUS304 stainless steel in the same manner as in embodiment 1, and was formed into a predetermined shape through chemical etching by use of acid solution mixture of both hydrogen fluoride and nitric acid while masking or by use of machining, so that the side became thinner in comparison with the corner 20, and concaves were formed at the outside (FIG. 11B) or at the inside (FIG. 11C) of a tubular body. The thinner parts of thickness in FIGS. 11A to 11C were made to have the same thickness for each side of the quadrilateral. In FIG. 12, thicknesses at side parts are made different from each other regarding the upper and lower part position, that is, the upper part 22 is thinner in thickness than the lower part 23.

In the structure of the present embodiment, it is intended to prevent blister by creep deformation from occurring due to the use for a long period of time. Also, in the case of the present structure, Zr based alloys described in Embodiments 1 and 2 can be used likewise, and bow due to an irradiation growth can be also prevented by effecting quenching treatment in the same manner.

Embodiment 4

Figure 13:
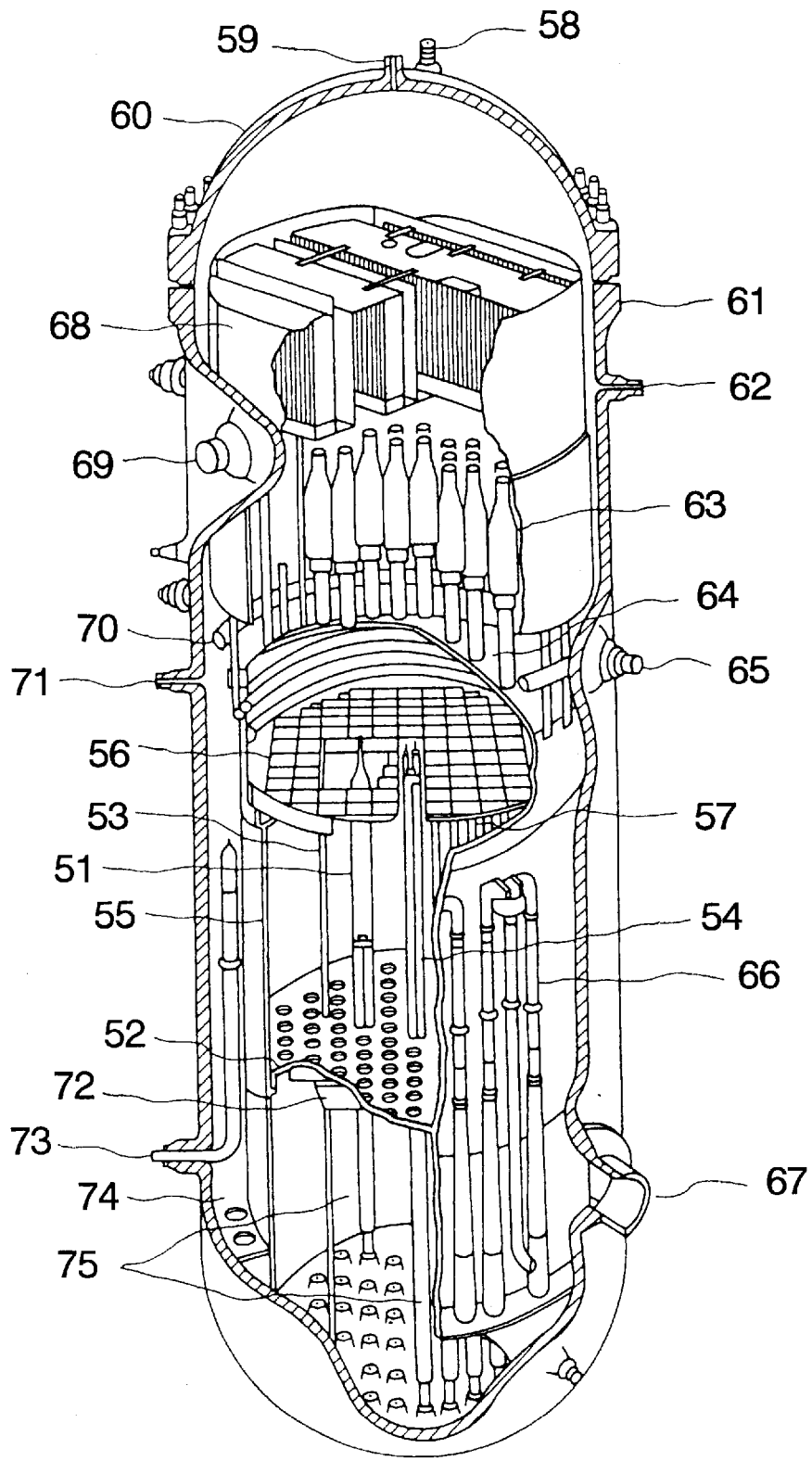
FIG. 13 is the whole view of the atomic reactor.

FIG. 13 is a partially cross-sectional drawing of the whole atomic reactor core of the boiling water type in which the fuel assembly is constituted by use of the channel box obtained in the Embodiment 1 to 3.

The present atomic reactor according to the present invention is operated at a steam temperature of 286° C. and under a steam pressure of 70.7 atg, which can generate an electric power of 500, 800, and 1100 MW as a generated electric power output. Each appellation is as follows; neutron source pipe 51, core supporting plate 52, neutron measurement detector 53, control rod 54, core shroud 55, upper grit plate 56, fuel assembly 57, upper end plate spray nozzle 58, vent nozzle 59, pressure vessel cover 60, flange 61, nozzle for measurement 62, steam-water separator 63, shroud head 64, feed water inlet nozzle 65, jet pump 66, steam dryer 68, steam exit nozzle 69, feedwater-sparger 70, nozzle for core spray 71, lower core grit 72, re-circulation water inlet nozzle 73, baffle plate 74, and control rod drive guide tube 75.

An atomic reactor comprises an atomic reactor pressure vessel, a core contained in its inside, internal structures, control rods and its driving apparatus.

A cooling water jetted at high speed from nozzles of 20 pieces of jet pump 66 located around the circular ring part of the outer periphery of the core shroud 55 absorbs water around the circular ring part and feeds it to a plenum part at the lower part of the core. This cooling water is distributed to each fuel assembly via orifices attached to a supporting piece of each fuel assembly 57. Cooling medium which was heated in each fuel assembly to thereby become a mixture of water and steam is collected at the upper plenum and is re-distributed to many steam-water separators 63. Steam separated from steam-water separator 63 is fed to a turbine from a steam exit nozzle via a steam dryer 68 located a at further upper position. Water separated from steam is subcooled by feed water flowing from a feed water spurjar 70, and descends around the circular ring part of the core shroud 55, a portion of which is fed to a re-circulation pump from a re-circulation water exit nozzle 73, and then is fed to a jet pump from a re-circulation water exit nozzle 73 after being pressurized. Since the control rod 54 is inserted to the core from the lower part through the control rod guide tube 75, it is convenient to adjust output distribution and there is no trouble to detach the drive mechanism at the time of fuel exchange. However, as the drop thereof by gravity can not be utilized, the sure insertion by use of water pressure drive is necessary at the time of scram. Further, as a countermeasure for such risks as the fuel rod is stuck after being once inserted and as it is separated from the drive shaft to thereby fall by gravity with the result that output rise occurs due to abrupt reactivity increase, a recent BWR is equipped with a speed limiter for restricting the fall speed so as to prevent an accident from occurring.

Table 7 shows the main specification of a BWR or ABWR electric power generating plant obtained from the present embodiment. The present electric power generating plant features that no bow due to an irradiation growth of the fuel assembly occurs entirely at a high degree of burn-up of not less than 35 GWd/t (not less than four years) and the use of the fuel assembly and the zirconium alloy member for a long period of time becomes possible, which makes it possible to reduce the amount of spent fuel waste. Corrosion resistance and reliability of the fuel assembly can also be improved because each of the fuel cladding tube, the channel box and the spacer is subjected to the quenching in $\alpha+\beta$ phase or $\beta$ phase as mentioned above.

According to the present invention, as described above, the crystal orientation of a fuel assembly zirconium member can be made random, so that no serious bow deformation due to irradiation growth occurs even during such a use in a high irradiation environment as an amount of neutron irradiation exceeds $10^{22}$ (n/cm$^2$), and the minimization of shuffling can be achieved. Consequently, the use of the fuel assembly zirconium member for a long period of time is applicable to an atomic reactor of high degree of burn-up, which contributes to the reduction in the spent fuel waste. Further, the corrosion resistance is improved, and the blister deformation by thermal creep deformation is suppressed, and the leakage radiation dose is reduced, which can contribute to the improvement in reliability of the fuel assembly zirconium member.

What is claimed is:

1. An angular, tubular member made of a zirconium based alloy plate of low irradiation growth, containing not more than 5 wt % Sn and/or not more than 5 wt % Nb, and not less

TABLE 7

| Contents | ABWR | BWR |
| --- | --- | --- |
| Electric output | 1350 MW | 1100 MW |
| Thermal output of reactor | 3926 MW | 3293 MW |
| Pressure of reactor | 7.17 MPa(73.1 kgf/cm$^2$)(abs) | 7.03 MPa(71.7 kgf/cm$^2$)(abs) |
| Flow rate of main steam | 7480 t/h | 6410t/h |
| Temperature of feed water | 215° C. | 215° C. |
| Rated flow rate of core | 52 × 10$^6$ kg/h | 48 × 10$^6$ kg/h |
| Number of pieces of fuel assemblies | 872 pieces | 764 pieces |
| Number of pieces of control rods | 205 pieces | 185 pieces |
| Average output density of core | 50.5 kW/l | 50.0 kW/l |
| Pressure vessel of reactor | | |
| Diameter | 7.1 m | 6.4 m |
| Height | 21.0 m | 22.2 m |
| Recycle system for reactor (number of pumps) | Internal pump(10) | External recirculation pump(2) jet pump(20) |
| Driving system for control rods | | |
| Normal | Fine adjustment electric motor drive type | Water pressure drive type |
| Scram | Water pressure drive type | Water pressure drive type |
| Core-cooling system for emergency | Automatic pressure-reducing system high pressure system(3 systems) low pressure system(3 systems) | Automatic pressure-reducing system High pressure system (1 system) Low pressure system (4 systems) |
| Cooling system at the time of the shut-down of reactor | 3 systems | 2 systems |
| Type of reactor container | Made of reinforced concrete with lining on inner face | Steel-made self-support type |
| Type of turbine | TCGF-52 type (2-stage, reheat) | TCGF-41/43 type (non reheating) |
| Steam-water separator | Dual tube, 3-stage type × 349 pieces | Triple tube, 2-stage × 225 pieces |
| Thermal sleeve of feed water sparger | Weld-type dual thermal sleeve | Weld-type usual thermal sleeve |
| Water-filling sparger for high pressure-care | Water pouring type | Spray type |
| Low pressure water-filling sparger | Down comer injection type | Pouring in shroud type |
| Upper grid plate | Integrally precut type | Grid plate insert type |
| Core-supporting plate | Cross reinforced beam | Parallel reinforced beam |
| In-core stabilizer | 2-stage shroud fixing | One-stage, without fixing of shroud |
| Control rods | No speed limiter, Bionet-coupling type | With speed limiter, spud-coupling type |
| Shroud-support legs | Height: 21.7 inch 10 pieces (set between internal pumps) | Height: 57.5 inch 12 pieces |
| Maximum neutron exposure | 4~5 × 10$^{22}$ n/cm$^2$ | 1 × 10$^{22}$ n/cm$^2$ |
| Years of operation | 30 years or more | 30 years or more |
| Average output (plant factor) | not less than 85% | not less than 85% |
| Period of operation | 12 months/time | 12 months/time |
| Period of regular checkup | Within 50 days/time | Within 50 days/time | than 90 wt % Zr, characterized in that said alloy having crystal orientation of hexagonal Zr in which <0001> orientation (Fl value) with respect to longitudinal direction of the tubular member ranges from 0.20 to 0.35, and the difference (ΔFl) in said Fl value between the opposed faces of the tubular member being not more than 0.025.

2. A tubular member of an angular shape made of a zirconium based alloy plate of low irradiation growth which member has a length not less than 4 m, containing not more than 5 wt % Sn and/or not more than 5 wt % Nb, and not less than 90 wt % Zr, characterized in that said alloy plate has <0001> orientation of crystals of hexagonal Zr, which <0001> orientation is substantially random, said <00001> orientation (Fl value) in a longitudinal direction with respect to opposed faces of said tubular member being substantially equal to each other so that an amount of bow per length of 4 m by neutron irradiation of 35 GWd/t degree of burn-up on taking-out is not more than 2.16 mm.

3. A tubular member according to claim 2, wherein the <0001> orientation (Fl value) with respect to the longitudinal direction ranges from 0.20 to 0.35.

4. A fuel channel box made of zirconium based alloy containing not more than 5 wt % Sn and/or not more than 5 wt % Nb, and not less than 90 wt % Zr, said alloy having crystal orientation of hexagonal Zr in which <0001> orientation (Fl value) with respect to longitudinal direction ranges from 0.20 to 0.35, with Fl values with respect to opposed faces of said tubular member being substantially equal to each other so that an amount of bow per length of 4 m by neutron irradiation of 35 GWd/t degree of burn-up on taking-out is not more than 2.16 mm.

5. A method of producing a tubular member of angular shape made of a zirconium based alloy of low irradiation growth, comprising the steps of locally heating into a β single phase temperature range the tubular member of said zirconium alloy containing not more than 5 wt % Sn and/or not more than 5 wt % Nb, and not less than 90 wt % Zr, by use of continuous induction-heating, and forcibly cooling the heated portion by use of a cooling medium, characterized in that said heating is performed for a short period of time in said β single phase temperature range together with rapid cooling performed thereafter so that <0001> orientation (Fl value) of hexagonal Zr with respect to longitudinal direction of the tubular member ranges from 0.20 to 0.35, wherein a difference in temperature between the opposed faces of the tubular member with respect to said heating is sufficiently small so that a difference (ΔFl) in Fl values between the opposed faces of the tubular member is not more than 0.025.

6. A fuel channel box of a tubular member of angular shape formed by welding two channel-shaped members made of zirconium based alloy, characterized in that said alloy has crystal orientation of hexagonal Zr in which <0001> orientation (Fl value) with respect to longitudinal direction of the tubular member ranges from 0.20 to 0.35, the difference (ΔFl) in said Fl between the opposed faces of the tubular member being not more than 0.025, the whole surface of said channel box being provided with oxide coating formed by autoclave treatment.

7. A fuel assembly comprising fuel rods each provided with fuel pellet in a fuel cladding tube, a channel box receiving a plurality of pieces of the fuel rods, a spacer for partitioning the fuel rods received in the channel box, and upper and lower grids located respectively at the upper and lower portions of the channel box, characterized in that said channel box is made of a zirconium based alloy containing not more than 5 wt % Sn and/or not more than 5 wt % Nb, and not less than 90 wt % Zr, said alloy having crystal orientation of a hexagonal Zr in which <0001> orientation (Fl value) with respect to longitudinal direction of said alloy ranges from 0.20 to 0.35, difference in said Fl between the opposed faces of said channel box being not more than 0.025.

8. A fuel assembly comprising a long, tubular channel box provided therein with a fuel body having uranium fuel, a fuel rod receiving said uranium fuel, a lower tie plate supporting fuel rod and a spacer, characterized in that said channel box made of a Zr based alloy has crystal orientation of a hexagonal Zr in which <0001> orientation (Fl value) with respect to longitudinal plate direction of the channel box ranges from 0.20 to 0.35, difference (ΔFl) in the Fl values between the opposed planes of said channel box being not more than 0.025, each of β-phase Zr grains having no subboundary in it.

9. A fuel assembly according to claim 8, comprising a fuel channel box of an angular tube, said tube being produced by the steps of subjecting a zirconium based alloy raw material plate to a quenching treatment in which the plate is quenched from β-phase temperature range, subjecting the quenched plate to cold working and annealing, thereafter bending the plate to have a U-shape, annealing it, and welding abutted portions of the plates to form the angular tube.

10. A method of producing a tubular member of angular shape made of a zirconium based alloy containing not more than 5 wt % Sn and/or not more than 5 wt % Nb, and not less than 90 wt % Zr, comprising the steps of locally heating successively the tubular member of the zirconium based alloy in a β single phase temperature range, and forcibly cooling the locally heated portion, characterized in that said heating is performed by passing the tubular member continuously in a high-frequency induction heating coil of plural windings, and said cooling is performed by jetting a cooling medium through a cooling nozzle provided at a rear of said coil, said method further comprising a step of controlling heating temperature of opposed faces of said tubular member so that said alloy has crystal orientation of hexagonal Zr in which <0001> orientation (Fl value) in longitudinal direction of said tubular member ranges from 0.20 to 0.35 and so that a difference (ΔFl) in Fl values between the opposed faces of the tubular member is not more than 0.025.

11. A method of producing a tubular member of angular shape made of a zirconium based alloy containing not more than 5 wt % Sn and/or not more than 5 wt % Nb, and not less than 90 wt % Zr, comprising the steps of locally heating successively the tubular member of the zirconium based alloy in a β single phase temperature range, and quenching the locally heated portion by forcibly cooling the locally heated portion through a cooling medium, said quenching being effected plural times, said method further comprising a step of controlling heating temperature of opposed faces of said tubular member so that said alloy has crystal orientation of hexagonal Zr in which <0001> orientation (Fl value) in longitudinal direction of said tubular member ranges from 0.20 to 0.35 and so that a difference (ΔFl) in Fl values between the opposed faces of the tubular member is not more than 0.025.

* * * * *